United States Patent
Shintani et al.

(10) Patent No.: US 11,938,083 B2
(45) Date of Patent: Mar. 26, 2024

(54) WALKING SUPPORT SYSTEM

(71) Applicant: TOYOTA JIDOSHA KABUSHIKI KAISHA, Aichi-ken (JP)

(72) Inventors: Kohei Shintani, Nisshin (JP); Hiroaki Kawamura, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 169 days.

(21) Appl. No.: 17/688,006

(22) Filed: Mar. 7, 2022

(65) Prior Publication Data

US 2022/0370283 A1    Nov. 24, 2022

(30) Foreign Application Priority Data

May 13, 2021    (JP) ................. 2021-081466

(51) Int. Cl.
*A61H 3/06*    (2006.01)

(52) U.S. Cl.
CPC ....... *A61H 3/061* (2013.01); *A61H 2003/063* (2013.01); *A61H 2201/5007* (2013.01); *A61H 2201/5048* (2013.01); *A61H 2201/5092* (2013.01); *A61H 2201/5097* (2013.01)

(58) Field of Classification Search
None
See application file for complete search history.

(56) References Cited

U.S. PATENT DOCUMENTS

| 2013/0250078 A1* | 9/2013 | Levy | G01C 21/20 |
| | | | 348/62 |
| 2019/0307632 A1* | 10/2019 | Yashiro | G06V 10/757 |
| 2021/0154086 A1* | 5/2021 | Crosby | A61H 3/061 |

FOREIGN PATENT DOCUMENTS

JP    WO2018025531 A1    5/2018

* cited by examiner

*Primary Examiner* — Thomas S McCormack
(74) *Attorney, Agent, or Firm* — HAUPTMAN HAM, LLP

(57) ABSTRACT

It is determined whether a traffic light is recognized in an image based on each of a result of a recognition operation by a traffic light first recognition unit (a recognition operation of the traffic light for an image acquired by a camera using a learned model based on pre-annotated data) and a result of a recognition operation by a traffic light second recognition unit (a recognition operation of the traffic light for an image acquired by the camera based on a feature amount of the traffic light). This makes it possible to sufficiently obtain the recognition accuracy of the traffic light, and to appropriately perform an instruction to a pedestrian according to the state of the traffic light.

9 Claims, 11 Drawing Sheets

| CASE | METHOD 1 | METHOD 2 | DETERMINATION |
|---|---|---|---|
| CASE 1 | ○ | ○ | ○ |
| CASE 2 | X ← AUXILIARY | ○ | RE-INFERENCE AFTER CORRECTION |
| CASE 3 | ○ | AUXILIARY → X | RE-INFERENCE AFTER CORRECTION |
| CASE 4 | X | X | X |

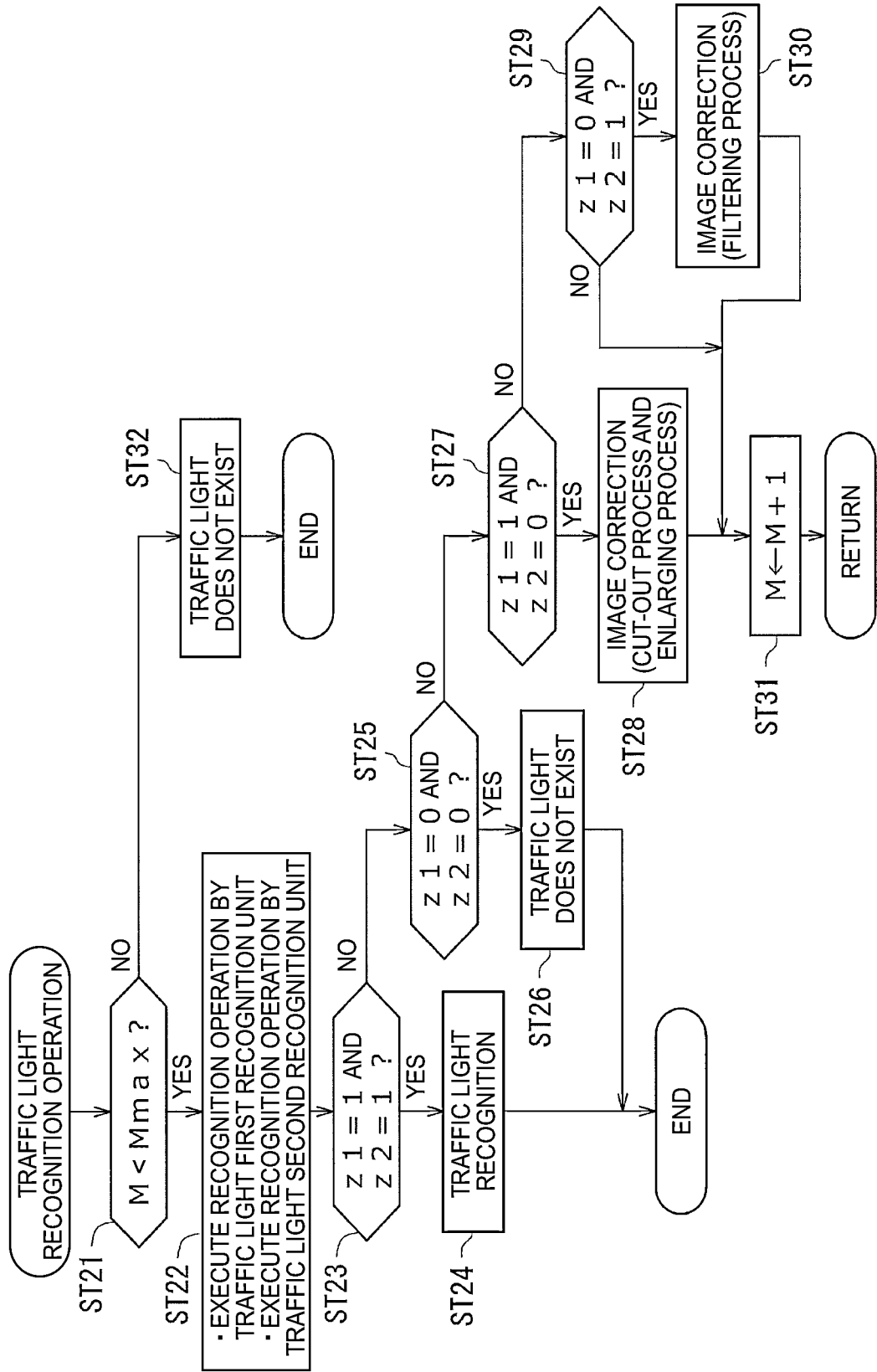

WALKING SUPPORT SYSTEM

CROSS-REFERENCE TO RELATED APPLICATION

This application claims priority to Japanese Patent Application No. 2021-081466 filed on May 13, 2021, incorporated herein by reference in its entirety.

BACKGROUND

1. Technical Field

The present disclosure relates to a walking support system. In particular, the present disclosure relates to a measure for improving the recognition accuracy of a traffic light when performing a notification for supporting walking of a pedestrian such as a visually impaired person.

2. Description of Related Art

A system disclosed in Re-publication of PCT International Publication No. 2018-025531 (WO 2018-025531) is known as a system (walking support system) that performs a notification to support walking of a pedestrian such as a visually impaired person. WO 2018-025531 discloses a technique including a direction determination unit that determines the direction in which a person who acts without using vision (a visually impaired person) walks and a guide information generation unit that generates guide information for guiding the visually impaired person to walk in the determined direction. In the technique, the walking direction of the visually impaired person is determined by matching an image from a camera carried by the visually impaired person and a reference image stored in advance to guide the visually impaired person with the walking direction by voice or the like.

SUMMARY

In this kind of walking support system, in a situation where a pedestrian (visually impaired person or the like) approaches a crosswalk and a traffic light (for example, a pedestrian traffic light) is a red light, it is necessary to perform a notification instructing the pedestrian to stop, and when the pedestrian is stopped in a position before the crosswalk and the traffic light switches to a green light, it is necessary to perform a notification instructing the pedestrian to walk (cross the crosswalk). In order to appropriately perform various notifications to the pedestrian (the stop notification of walking before the crosswalk and the subsequent crossing start notification), it is essential that the existence of the traffic light and the state of the traffic light (whether the traffic light is a green light or a red light) are accurately recognized via information from an image acquisition unit such as a camera.

The present disclosure has been made in view of the above points, and an object of the present disclosure is to provide a walking support system that can obtain sufficient recognition accuracy of a traffic light and that can appropriately perform a notification to a pedestrian.

A solution of the present disclosure for achieving the above object is premised on a walking support system that recognizes a traffic light located in front of a pedestrian in a walking direction and that performs at least one of a stop instruction to the pedestrian before a crosswalk and a crossing start instruction of the crosswalk to the pedestrian according to a state of the traffic light. The walking support system includes an image acquisition unit, a traffic light first recognition unit, a traffic light second recognition unit, and a determination unit. The image acquisition unit is able to acquire an image in front of the pedestrian in the walking direction. The traffic light first recognition unit performs a recognition operation of the traffic light for the image acquired by the image acquisition unit using a learned model based on pre-annotated data. The traffic light second recognition unit performs a recognition operation of the traffic light for the image acquired by the image acquisition unit based on a feature amount of the traffic light. The determination unit determines whether the traffic light is recognized in the image based on each of a result of the recognition operation by the traffic light first recognition unit and a result of the recognition operation by the traffic light second recognition unit.

The term "recognition of the traffic light" as used herein is a concept including both the recognition of the position of the traffic light and the recognition of whether the traffic light is a green light or a red light in the image acquired by the image acquisition unit.

Due to this specific matter, the recognition operation of the traffic light is performed by each of the traffic light first recognition unit and the traffic light second recognition unit for the image in front of the pedestrian in the walking direction acquired by the image acquisition unit. That is, the traffic light first recognition unit performs the recognition operation of the traffic light using a learned model based on pre-annotated data. Further, the traffic light second recognition unit performs the recognition operation of the traffic light based on a feature amount of the traffic light. Based on the result of these recognition operations, the determination unit determines whether the traffic light is recognized in the image. This makes it possible to sufficiently obtain the recognition accuracy of the traffic light, and to appropriately perform an instruction (at least one of the stop instruction and the crossing start instruction) to a pedestrian according to the state of the traffic light.

The configuration is such that, when the determination unit obtains a result that the traffic light is recognized in both the recognition operation by the traffic light first recognition unit and the recognition operation by the traffic light second recognition unit, the determination unit determines that the traffic light is recognized in front in the walking direction, and when the determination unit obtains a result that the traffic light is not recognized in both the recognition operation by the traffic light first recognition unit and the recognition operation by the traffic light second recognition unit, the determination unit determines that the traffic light does not exist in front in the walking direction.

This makes it possible to obtain high reliability in the recognition operation of the traffic light.

The walking support system further includes a re-recognition processing unit that, when a result that the traffic light is recognized is obtained only in a recognition operation by one recognition unit of the recognition operation by the traffic light first recognition unit and the recognition operation by the traffic light second recognition unit, performs an auxiliary process using the result of the recognition operation by the one recognition unit and causes the other recognition unit to perform the recognition operation again.

Therefore, when the traffic light is not recognized in the recognition operation by one of the recognition units (when the traffic light is not recognized even though the traffic light exists), the possibility that the traffic light is recognized in the re-recognition operation can be increased, which also makes it possible to obtain high reliability in the recognition operation of the traffic light.

In this case, when a result that the traffic light is recognized is obtained only in the recognition operation by the traffic light first recognition unit, the re-recognition processing unit performs a cut-out process and an enlarging process on an area where the traffic light exists obtained by deep learning, and causes the traffic light second recognition unit to perform the recognition operation again.

Therefore, the possibility that the traffic light is recognized in the re-recognition operation by the traffic light second recognition unit can be increased, which also makes it possible to obtain high reliability in the recognition operation of the traffic light.

When a result that the traffic light is recognized is obtained only in the recognition operation by the traffic light second recognition unit, the re-recognition processing unit performs, in consideration of whether a shape and a lighting color of the traffic light that are feature amounts of the traffic light satisfy predetermined requirements, a preprocess for the requirements on the image to perform a filtering process of unnecessary information, and causes the traffic light first recognition unit to perform the recognition operation again.

Therefore, the possibility that the traffic light is recognized in the re-recognition operation by the traffic light first recognition unit can be increased, which also makes it possible to obtain high reliability in the recognition operation of the traffic light.

The feature amounts of the traffic light are specifically an aspect ratio predefined for the traffic light and a hue, a saturation, and a brightness of a lighting color.

Since the aspect ratio and the lighting color of the traffic light are predefined by the Road Traffic Act Enforcement Regulations and the Metropolitan Police Department Traffic Specification Standard, by determining whether a feature portion that matches these feature amounts exists in the image acquired by the image acquisition unit, it is possible to recognize whether the traffic light exists with high accuracy.

The traffic light second recognition unit performs the recognition operation using an average value of the saturation and an average value of the brightness of a plurality of pixel areas in an area corresponding to the hue of the lighting color in the image acquired by the image acquisition unit.

When the area corresponding to the hue of the lighting color in the image acquired by the image acquisition unit is the lighting portion of the traffic light, the reflected light (sunlight, etc.) existing in a part of the area of the image may become a disturbance, which may lead to a decrease in the accuracy of recognition of whether the traffic light exists. In the present solution, the recognition operation by the traffic light second recognition unit is performed by using the average value of the saturation and the average value of the brightness of a plurality of pixel areas in the area corresponding to the hue of the lighting color in the image. Therefore, even if a disturbance exists in a part of the pixel area, it is likely that the average value of the saturation and the average value of the brightness including other pixel areas (the pixel area where the disturbance does not exist) substantially match the saturation and the brightness of the lighting portion of the traffic light. Thus, by reducing the influence of the disturbance, the recognition accuracy of the traffic light by the traffic light second recognition unit can be increased.

The traffic light second recognition unit recognizes that the traffic light exists when both a deviation amount of the average value of the saturation and a deviation amount of the average value of the brightness exceed a predetermined amount. The saturation and the brightness are a saturation and a brightness in each of the area corresponding to the hue of the lighting color in the image acquired by the image acquisition unit and a predetermined area adjacent to the area.

In the traffic light, when the red lighting portion is lit, the green lighting portion that is a predetermined area adjacent to the red lighting portion (specifically, in the case of a pedestrian traffic light, the area adjacent to the lower side of the red lighting portion) is turned off. In contrast, when the green lighting portion is lit, the red lighting portion that is a predetermined area adjacent to the green lighting portion (in the case of a pedestrian traffic light, the area adjacent to the upper side of the green lighting portion) is turned off. That is, in the image acquired by the image acquisition unit, the area corresponding to one lighting portion is red or green, and the area corresponding to the other lighting portion is black. In other words, in this state, both the deviation amount of the average value of the saturation and the deviation amount of the average value of the brightness in each lighting portion are large. Taking advantage of this, in the present solution, it is recognized that the traffic light exists when both the deviation amount of the average value of the saturation and the deviation amount of the average value of the brightness in each of the area corresponding to the hue of the lighting color in the image acquired by the image acquisition unit and the predetermined area adjacent to the area exceed a predetermined amount. Thus, the recognition accuracy of the traffic light by the traffic light second recognition unit can be increased.

Further, when the image acquisition unit, the traffic light first recognition unit, the traffic light second recognition unit, and the determination unit are each built into a white cane used by a visually impaired person, the walking support system can be realized only with the white cane, so that a highly practical walking support system can be provided.

The walking support system further includes a notification unit for performing a notification to the pedestrian to stop before the crosswalk or to start crossing the crosswalk according to the state of the traffic light located in front of the pedestrian in the walking direction. The notification unit is configured to perform the notification to the visually impaired person by vibration or voice.

As a result, the notifications can be appropriately performed to the visually impaired person (the pedestrian) who walks while holding the white cane.

In the present disclosure, it is determined whether the traffic light is recognized in the image based on each of the result of the recognition operation by the traffic light first recognition unit (the recognition operation of the traffic light for the image acquired by the image acquisition unit using a learned model based on pre-annotated data) and the result of the recognition operation by the traffic light second recognition unit (the recognition operation of the traffic light for the image acquired by the image acquisition unit based on a feature amount of the traffic light). This makes it possible to sufficiently obtain the recognition accuracy of the traffic light, and to appropriately perform an instruction to a pedestrian according to the state of the traffic light.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 17 is a diagram showing a subroutine that is a traffic light recognition operation in the flowchart of FIG. 16.

DETAILED DESCRIPTION OF EMBODIMENTS

Hereinafter, embodiments of the present disclosure will be described with reference to the drawings. The present embodiment describes a case where a walking support system according to the present disclosure is built in a white cane used by a visually impaired person. Pedestrians in the present disclosure are not limited to visually impaired persons.

Schematic Configuration of White Cane

Figure 1:
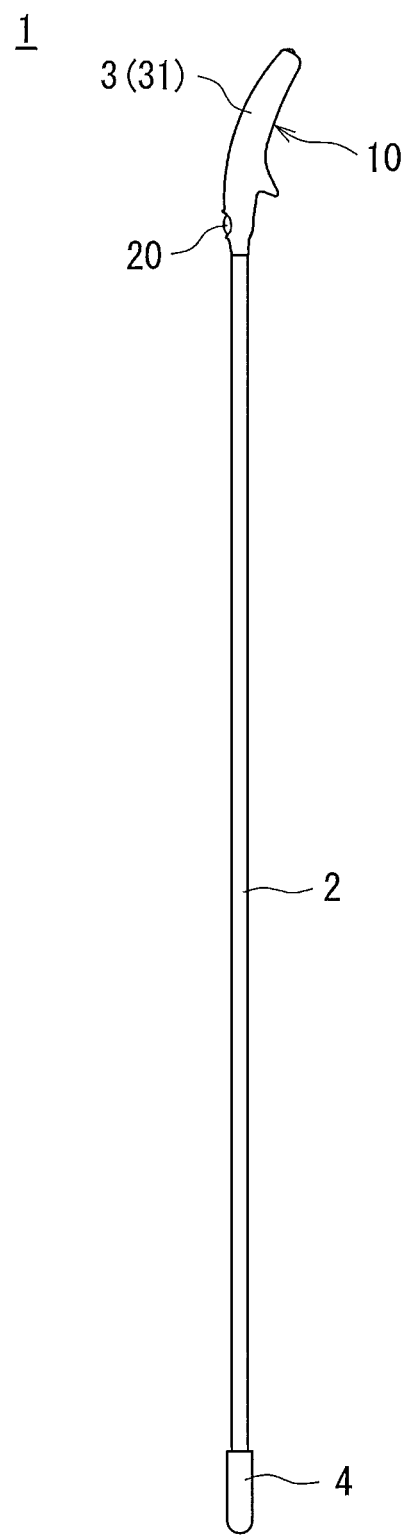
FIG. 1 is a diagram showing a white cane including a walking support system according to an embodiment.

FIG. 1 is a diagram showing a white cane 1 including a walking support system 10 according to the present embodiment. As shown in FIG. 1, the white cane 1 includes a shaft portion 2, a grip portion 3, and a tip portion (ferrule) 4.

The shaft portion 2 is rod-shaped with a hollow substantially circular section, and is made of aluminum alloy, glass-fiber reinforced resin, carbon fiber reinforced resin, or the like.

The grip portion 3 is configured by mounting a cover 31 made of an elastic body such as rubber to a base end portion (upper end portion) of the shaft portion 2. The grip portion 3 of the white cane 1 according to the present embodiment is slightly curved on the tip side (upper side in FIG. 1) in consideration of gripping ease and slipperiness when the visually impaired person (pedestrian) grips the grip portion 3.

The tip portion 4 is a substantially bottomed cylindrical member made of hard synthetic resin or the like, and is fitted onto the tip end portion of the shaft portion 2 and fixed to the shaft portion 2 by means such as adhesion or screwing. For safety, an end surface of the tip portion 4 on the tip end side has a hemispherical shape.

The white cane 1 according to the present embodiment is a straight cane that cannot be folded. However, the white cane 1 may be a cane that is foldable or expandable/contractable at an intermediate location or at a plurality of locations of the shaft portion 2.

Configuration of Walking Support System

A feature of the present embodiment is the walking support system 10 built in the white cane 1. Hereinafter, the walking support system 10 will be described.

Figure 2:
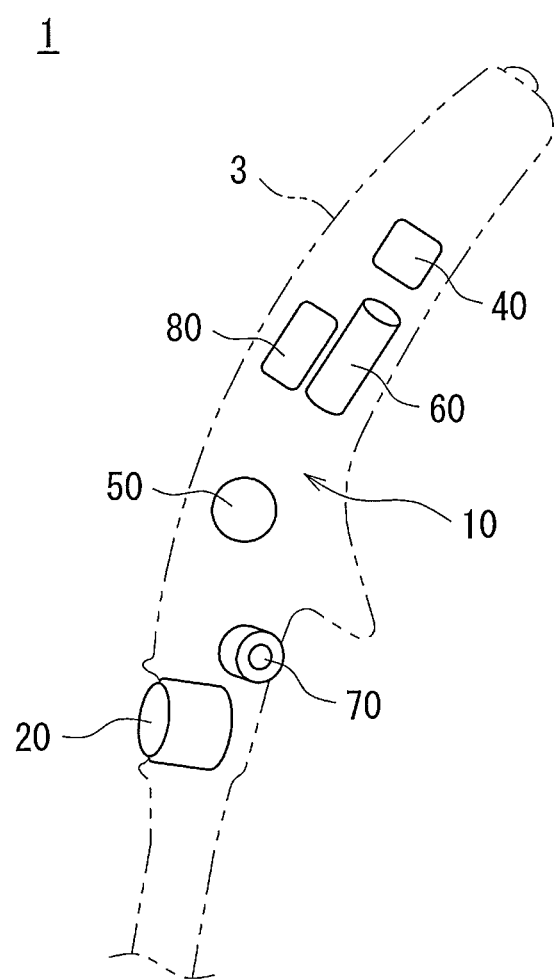
FIG. 2 is a schematic diagram showing the inside of a grip portion of the white cane.
Figure 3:
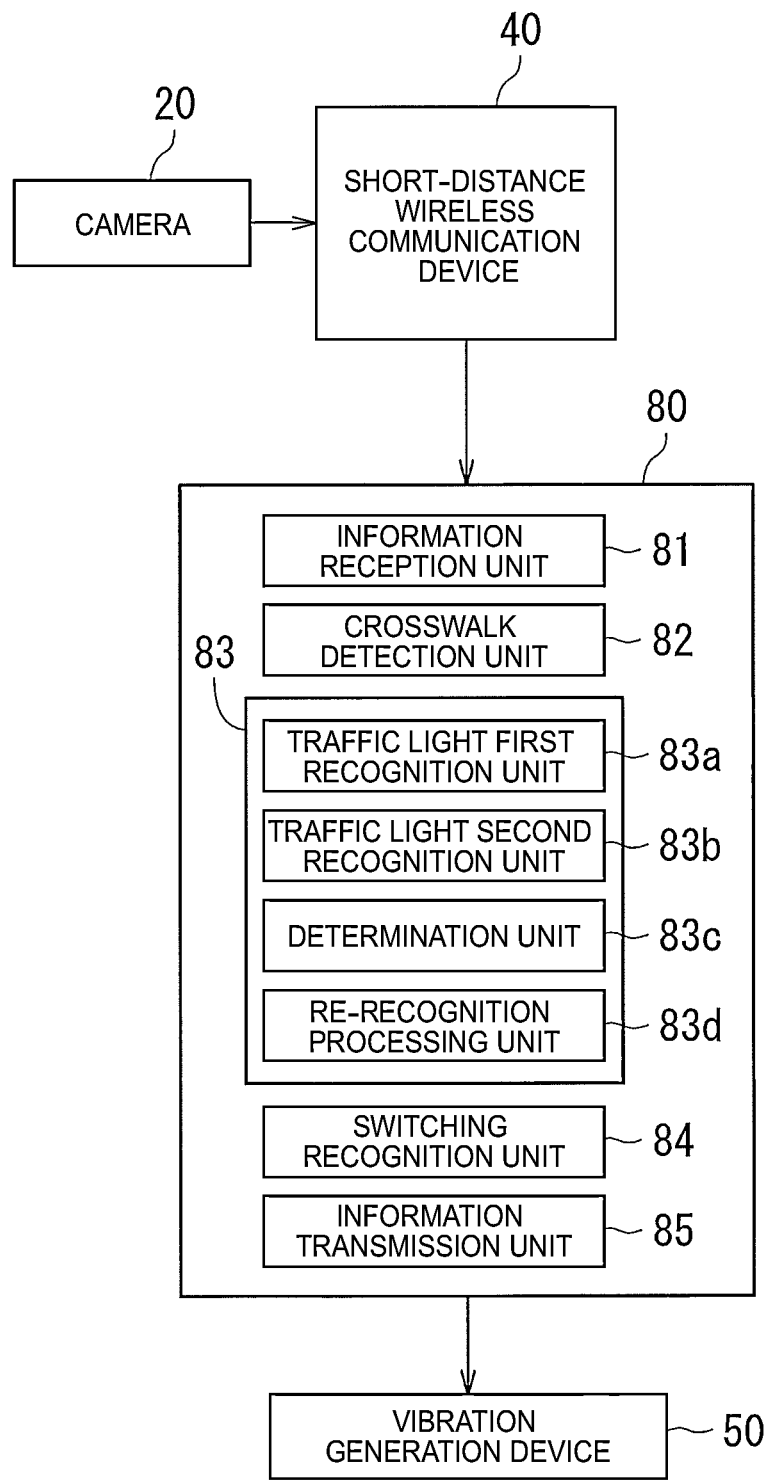
FIG. 3 is a block diagram showing a schematic configuration of a control system of the walking support system.

FIG. 2 is a schematic diagram showing the inside of the grip portion 3 of the white cane 1. As shown in FIG. 2, the walking support system 10 according to the present embodiment is built in the white cane 1. FIG. 3 is a block diagram showing a schematic configuration of a control system of the walking support system 10.

As shown in these figures, the walking support system 10 includes a camera (image acquisition unit) 20, a short-distance wireless communication device 40, a vibration generation device (notification unit) 50, a battery 60, a charging socket 70, a control device 80, and the like.

The camera 20 is embedded in a front surface (a surface facing the traveling direction of the visually impaired person) of the grip portion 3 on a root portion of the grip portion 3 and captures an image of the front in the traveling direction (front in the walking direction) of the visually impaired person. The camera 20 is configured by, for example, a charge coupled device (CCD) or a complementary metal oxide semiconductor (CMOS). The configuration and the arrangement position of the camera 20 are not limited to those described above, and the camera 20 may be embedded in the front surface (a surface facing the traveling direction of the visually impaired person) of the shaft portion 2, for example.

As a feature of the camera 20, the camera 20 is configured as a wide-angle camera capable of acquiring an image of the front in the traveling direction of the walking visually impaired person, the image including both a white line closest to the visually impaired person of the white lines of the crosswalk and the traffic light located in front of the visually impaired person (for example, a pedestrian traffic light) when the visually impaired person reaches the crosswalk. That is, the camera 20 is configured to be capable of capturing an image of both the frontmost white line of the crosswalk near the feet of the visually impaired person (at a position slightly ahead of the feet) at the time when the visually impaired person has reached a position before the crosswalk, and the traffic light installed on a point at the crossing destination. The view angle required for the camera 20 is appropriately set so that an image including both the white line (white line of the crosswalk) closest to the visually impaired person and the traffic light can be acquired (captured) as described above.

The short-distance wireless communication device 40 is a wireless communication device for performing short-distance wireless communication between the camera 20 and the control device 80. For example, the short-distance wireless communication device 40 is configured to perform short-distance wireless communication between the camera 20 and the control device 80 by known communication means such as Bluetooth (registered trademark) to wirelessly transmit information of the image captured by the camera 20 to the control device 80.

The vibration generation device 50 is arranged above the camera 20 in the root portion of the grip portion 3. The vibration generation device 50 vibrates in response to the operation of the built-in motor and transmits the vibration to the grip portion 3, thereby various notifications can be performed toward the visually impaired person gripping the grip portion 3. Specific examples of the notifications performed to the visually impaired person through the vibration of the vibration generation device 50 will be described later.

The battery 60 is configured by a secondary battery that stores electric power for the camera 20, the short-distance wireless communication device 40, the vibration generation device 50, and the control device 80.

The charging socket 70 is a part where a charging cable is connected when storing electric power in the battery 60. For example, the charging cable is connected when the visually impaired person charges the battery 60 from a household power source at home.

The control device 80 includes, for example, a processor such as a central processing unit (CPU), a read only memory (ROM) that stores a control program, a random access memory (RAM) that stores data temporarily, an input/output port, and the like.

The control device 80 includes, as functional units realized by the control program, an information reception unit 81, a crosswalk detection unit 82, a traffic light recognition unit 83, a switching recognition unit 84, and an information transmission unit 85. An outline of the functions of each of the above units will be described below.

The information reception unit 81 receives information of the image captured by the camera 20 from the camera 20 via the short-distance wireless communication device 40 at a predetermined time interval.

The crosswalk detection unit 82 recognizes the crosswalk in the image from the information of the image received by the information reception unit 81 (information of the image captured by the camera 20) and detects the position of each white line of the crosswalk.

Figure 4:
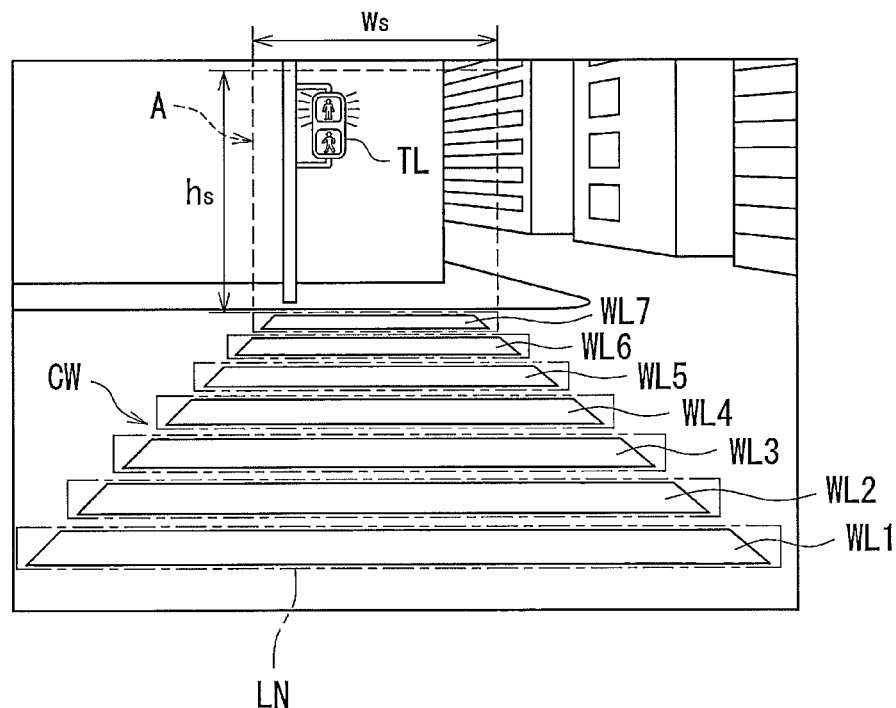
FIG. 4 is a diagram showing an example of an image captured by a camera.

Specifically, as shown in FIG. 4 (a figure showing an example of the image captured by the camera 20), a boundary box is set for each of the plurality of white lines WL1 to WL7 that constitutes a crosswalk CW (see long-dashed short-dashed lines in FIG. 4). For example, the white lines WL1 to WL7 of the crosswalk CW are confirmed by a known matching process, and the boundary boxes are set for the confirmed white lines WL1 to WL7. The white lines WL1 to WL7 may be confirmed using data of the pre-annotated white lines (labeled data of the white lines, that is, teacher data for recognizing the white lines by deep learning), and the boundary boxes may be set for the confirmed white lines WL1 to WL7.

Of these boundary boxes, the crosswalk detection unit 82 detects the lower end position of the boundary box closest to the pedestrian (see LN in FIG. 4). In the present embodiment, a boundary box is set for each white line WL1 to WL7 and the lower end position LN of the boundary box positioned on the lowest side in the image is detected. However, of the white lines WL1 to WL7 that have been confirmed in the image, the lower end position of the white line WL1 positioned on the lowest side may be detected, without setting the boundary boxes.

As described later, the boundary boxes are used for specifying a stop position of the visually impaired person, specifying a position of a traffic light TL, specifying the traveling direction of the visually impaired person when the visually impaired person crosses the crosswalk CW, determining crossing completion of the crosswalk CW, and the like. Details of the above will be described later.

The traffic light recognition unit 83 recognizes the position of the traffic light TL and the state of the traffic light TL (recognition of whether the traffic light TL is a red light or a green light) from the information of the image received by the information reception unit 81. Specifically, the traffic light recognition unit 83 estimates the existing area of the traffic light TL in the image received by the information reception unit 81, and recognizes the position of the traffic light TL and the state of the traffic light TL inside the estimated area. In estimating an existing area of the traffic light TL in the image received by the information reception unit 81, of the boundary boxes set for the white lines WL1 to WL7 that have been recognized as described above, the coordinates of the farthest boundary box in the image is specified, and as shown in FIG. 4, a quadrangle (a quadrangle having a width dimension of $w_s$ and a height dimension of $h_s$) that contacts the upper side of the above boundary box (the boundary box set for the white line WL7 positioned at the farthest position, of the recognized white lines WL1 to WL7) is defined. With the quadrangle defined as an area A of the traffic light TL (existing area of the traffic light TL), a cropped range is output. At this time, the cropped range may be a square or a rectangle. The position of the traffic light TL and the state of the traffic light TL within this cropped range are recognized. Details of the operation for recognizing the position of the traffic light TL and the state of the traffic light TL will be described later.

The switching recognition unit 84 recognizes that the state of the traffic light TL recognized by the traffic light recognition unit 83 has switched from the red light to the green light. Upon recognizing this switching of the traffic light, the switching recognition unit 84 transmits a switching signal to the information transmission unit 85. The switching signal is transmitted from the information transmission unit 85 to the vibration generation device 50. In conjunction with receiving the switching signal, the vibration generation device 50 vibrates in a predetermined pattern, thereby performing a notification for permitting crossing of the crosswalk (crossing start notification) to the visually impaired person, due to the fact that the traffic light TL has switched from the red light to the green light.

Walking Support Operation

Next, a walking support operation performed by the walking support system 10 configured as described above will be described. First, an outline of the present embodiment will be described.

Outline of Present Embodiment

Here, a time during walking of the visually impaired person is indicated as $t \in [0,T]$ and a variable representing the state of the visually impaired person is indicated as $s \in R^T$. The state variable at time t is represented by an integer of $s_t \in \{0,1,2\}$, each of which represents a walking state ($s_t=0$), a stop state ($s_t=1$), and a crossing state ($s_t=2$). For the walking state, for example, a state where the pedestrian is walking toward an intersection (an intersection including the traffic light TL and the crosswalk CW) is assumed. For the stop state, a state where the visually impaired person has reached a position before the crosswalk CW and is stopped (not walking) while waiting for the traffic light to change (waiting for the traffic light to switch from the red light to the green light) is assumed. For the crossing state, a state where the visually impaired person is crossing the crosswalk CW is assumed.

The present embodiment proposes an algorithm for obtaining an output $y \in R^T$ for the purpose of supporting walking of the visually impaired person when the image $X_t \in R^{w_0 \times h_0}$ ($w_0$ and $h_0$ each represent the longitudinal image size and the lateral image size) captured by the camera 20 at time t is input. Here, the output for supporting walking of the visually impaired person is represented by an integer of $y_t \in \{1,2,3,4\}$, each of which represents a stop instruction ($y_t=1$), a walking instruction ($y_t=2$), a right deviation warning ($y_t=3$), and a left deviation warning ($y_t=4$). In the following description, the stop instruction may be referred to as the stop notification. Further, the walking instruction may be referred to as the walking notification or the crossing notification. These instructions (notifications) and warnings are performed to the visually impaired person by the vibration pattern of the vibration generation device 50. The visually impaired person knows in advance the relationship between the instructions (notifications) and the warnings and the vibration patterns of the vibration generation device 50, and grasps the type of the instruction and the warning by sensing the vibration pattern of the vibration generation device 50 from the grip portion 3.

As described later, there are a function for determining the transition of a parameter s representing the state of the visually impaired person (hereinafter referred to as state transition function) $f_0$, $f_1$, $f_2$, and a state transition function $f_3$ for determining a deviation from the crosswalk (deviation in the right and left direction). These state transition functions $f_0$ to $f_3$ are stored in the ROM. Specific examples of the state transition functions $f_0$ to $f_3$ will be described later.

Outline of Output Parameter y and State Transition Function $f_i$

The above-mentioned output $y_t \in \{1,2,3,4\}$, for supporting walking of the visually impaired person will be described.

As described above, as the output $y_t$, for the purpose of supporting walking of the visually impaired person, there are four types of outputs, namely, the stop instruction ($y_t=1$), the walking instruction ($y_t=2$), the right deviation warning ($y_t=3$), and the left deviation warning ($y_t=4$).

Figure 5:
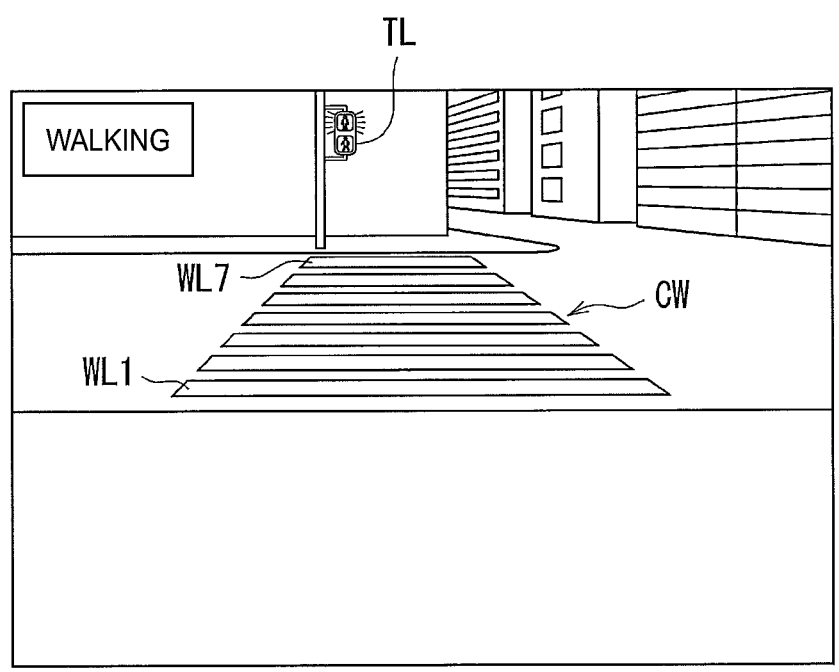
FIG. 5 is a diagram showing an example of an image captured by the camera when a visually impaired person is in a walking state heading toward a crosswalk.
Figure 6:
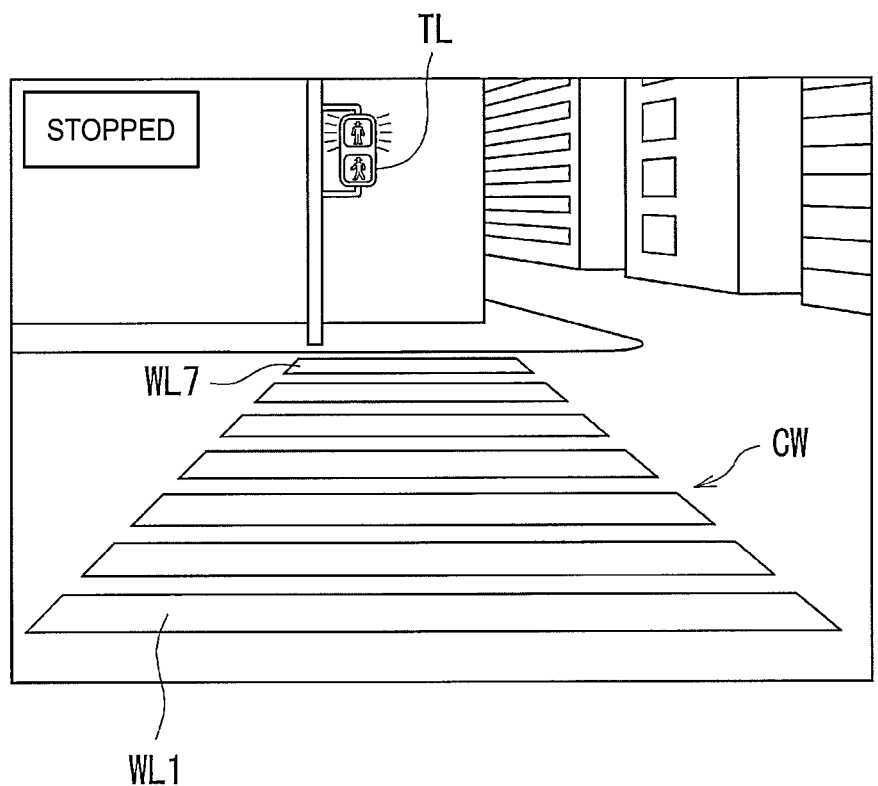
FIG. 6 is a diagram showing an example of an image captured by the camera at a timing when the visually impaired person has reached the crosswalk.

The stop instruction ($y_t=1$) is an instruction for notifying the visually impaired person to stop walking at the time when the walking visually impaired person has reached a position before the crosswalk. For example, when the image captured by the camera 20 indicates a state shown in FIG. 5 (a figure showing an example of the image captured by the camera 20 when the visually impaired person is in the walking state heading toward the crosswalk CW), the distance from the crosswalk CW is relatively long, so that the stop instruction ($y_t=1$) is not performed and the visually impaired person is caused to continue the walking state ($s_t=0$). However, when the image captured by the camera 20 indicates a state shown in FIG. 6 (a figure showing an example of the image captured by the camera 20 at a timing when the visually impaired person has reached the crosswalk CW), it is a timing that the visually impaired person has reached a position before the crosswalk CW, so that the stop instruction ($y_t=1$) is output and the visually impaired person is notified to stop walking. The determination on whether the condition for performing the stop instruction ($y_t=1$) is satisfied (the determination based on a calculation result of the state transition function) will be described later.

The walking instruction ($y_t=2$) is a notification for instructing the visually impaired person to walk (cross the crosswalk CW) when the traffic light TL switches from the red light to the green light. For example, when the visually impaired person is in the stop state ($s_t=1$) before the crosswalk CW and the traffic light TL switches from the red light to the green light based on the image captured by the camera 20, the walking instruction ($y_t=2$) is output to notify the visually impaired person to start crossing the crosswalk CW. The determination on whether the condition for performing the walking instruction ($y_t=2$) is satisfied (the determination based on a calculation result of the state transition function) will also be described later.

In the present embodiment, the timing for performing the walking instruction ($y_t=2$) is the timing at which the state of the traffic light TL is switched from the red light to the green light. That is, the walking instruction ($y_t=2$) is not performed even if the traffic light TL is already at the green light when the visually impaired person reaches the crosswalk CW, and the walking instruction ($y_t=2$) is performed at the timing at which the traffic light TL is switched to the green light after the traffic light TL once switches to the red light. This makes it possible to secure sufficient time during which the traffic light TL is at the green light when the visually impaired person crosses the crosswalk CW, and makes it difficult to cause a situation where the traffic light TL switches from the green light to the red light while the visually impaired person is crossing the crosswalk CW.

Figure 7:
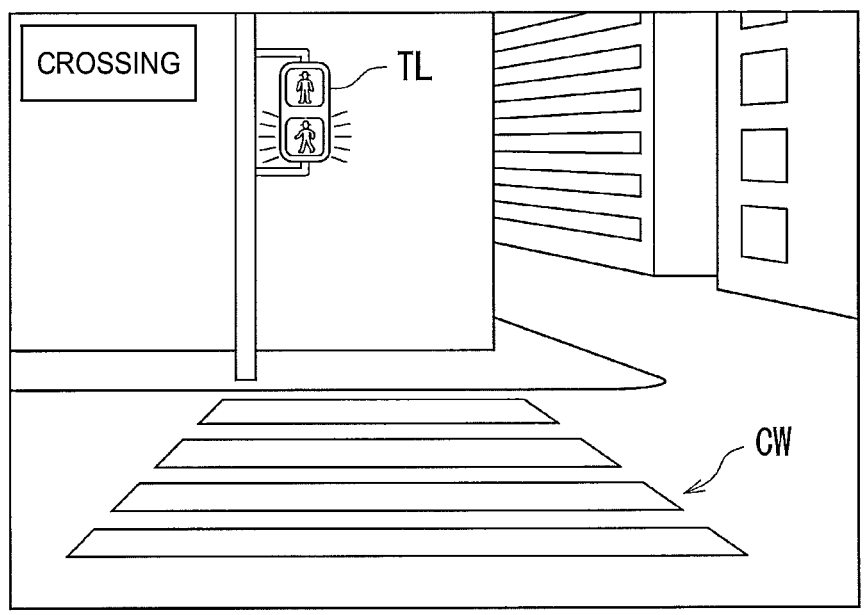
FIG. 7 is a diagram showing an example of an image captured by the camera when the visually impaired person is crossing the crosswalk in a crossing state.
Figure 8:
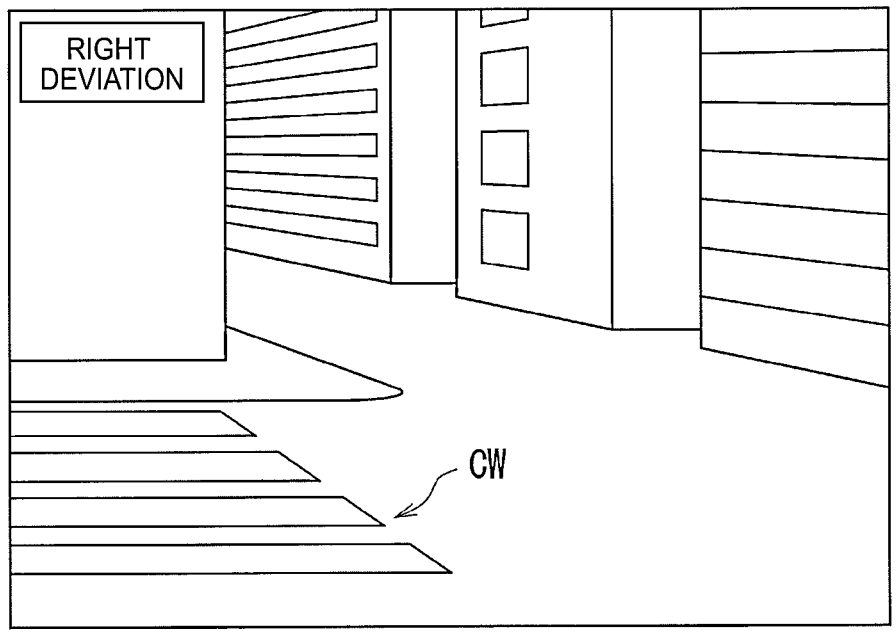
FIG. 8 is a diagram showing an example of an image captured by the camera when the visually impaired person crossing the crosswalk in the crossing state is walking toward a direction deviating to the right of the crosswalk.

The right deviation warning ($y_t=3$) is a notification for warning the visually impaired person that there is a risk of deviating to the right from the crosswalk CW, when the visually impaired person crossing the crosswalk CW is walking in a direction deviating to the right from the crosswalk CW. For example, in a state where the image captured by the camera 20 is in a state shown in FIG. 7 (a figure showing an example of the image captured by the camera 20 when the visually impaired person is crossing the crosswalk CW in the crossing state) and in a situation where the visually impaired person is crossing the crosswalk CW in the crossing state ($s_t=2$), when the image captured by the camera 20 changes to a state shown in FIG. 8 (a figure showing an example of the image captured by the camera 20 when the visually impaired person crossing the crosswalk CW in the crossing state is walking in the direction deviating to the right of the crosswalk CW), the visually impaired person is walking in the direction deviating to the right from the crosswalk CW, so that the right deviation warning ($y_t=3$) is output to warn the visually impaired person.

Figure 9:
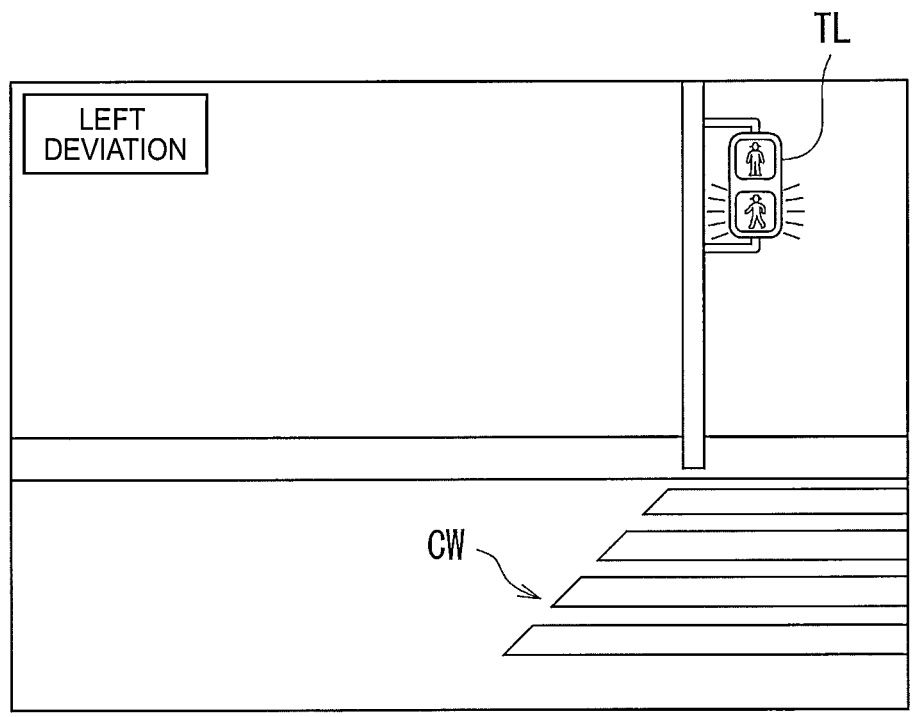
FIG. 9 is a diagram showing an example of an image captured by the camera when the visually impaired person crossing the crosswalk in the crossing state is walking toward a direction deviating to the left of the crosswalk.

The left deviation warning ($y_t=4$) is a notification for warning the visually impaired person that there is a risk of deviating to the left from the crosswalk CW, when the visually impaired person crossing the crosswalk CW is walking in a direction deviating to the left from the crosswalk CW. For example, in a state where the image captured by the camera 20 is in the state shown in FIG. 7 and in a situation where the visually impaired person is crossing the crosswalk CW in the crossing state ($s_t=2$), when the image captured by the camera 20 changes to a state shown in FIG. 9 (a figure showing an example of the image captured by the camera 20 when the visually impaired person crossing the crosswalk CW in the crossing state is walking in the direction deviating to the left of the crosswalk CW), the visually impaired person is walking in the direction deviating to the left from the crosswalk CW, so that the left deviation warning ($y_t=4$) is output to warn the visually impaired person.

The determination on whether the conditions for performing the right deviation warning ($y_t=3$) and the left deviation warning ($y_t=4$) are satisfied (the determination based on a calculation result of the state transition function) will also be described later.

Feature Amount Used for Walking Support

Next, the feature amount used for walking support for the visually impaired person will be described. In order to appropriately perform the various notifications to the visually impaired person, such as the stop notification of walking before the crosswalk CW and the subsequent crossing start notification, it is essential that the position of the crosswalk CW (the position of the frontmost white line WL1 of the crosswalk CW) and the state of the traffic light TL (whether the traffic light TL is a green light or a red light) are accurately recognized via the information from the camera 20. That is, it is necessary to construct a model expression that reflects the position of the white line WL1 and the state of the traffic light TL, and to be able to grasp the current situation of the visually impaired person according to this model expression.

Figure 10:
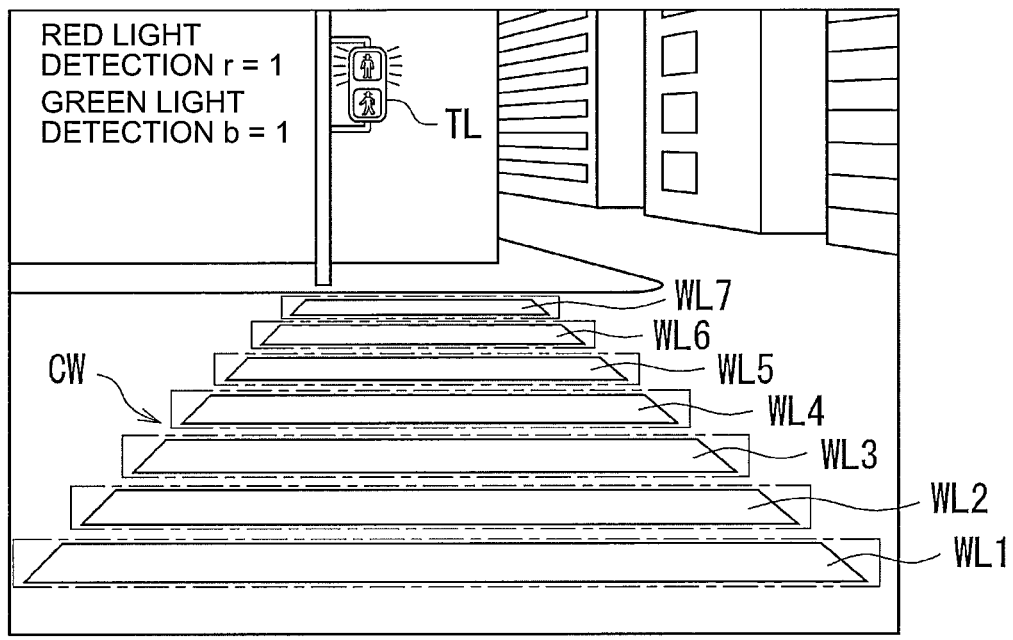
FIG. 10 is a diagram showing a crosswalk and a traffic light that have been recognized.
Figure 11:
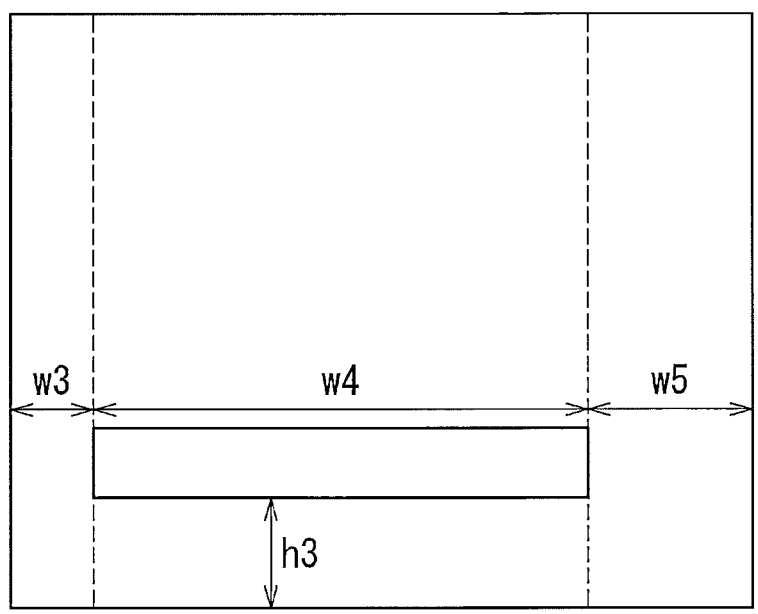
FIG. 11 is a diagram illustrating dimensions of each portion of a boundary box for a white line of the crosswalk that has been recognized.

FIGS. 10 and 11 show an outline of the feature amounts ($w_3$, $w_4$, $w_5$, $h_3$, r, b)$^T \in R^6$ used for the walking support for the visually impaired person. The characters r and b represent the detection results (0: undetected, 1: detected) of the state (red light and green light) of the traffic light TL, respectively. When detecting the state of the traffic light TL, as described above, the area A surrounded by the dashed line in FIG. 4 is extracted to recognize the state of the traffic light TL. The characters $w_3$, $w_4$, $w_5$, $h_3$ are defined as shown in FIG. 11 using a boundary box for the white line WL1 positioned in the frontmost position of the white lines WL1 to WL7 of the crosswalk CW recognized by the crosswalk detection unit 82. That is, $w_3$ is the distance from the left end of the image to the left end of the boundary box (corresponding to the left end of the white line WL1), $w_4$ is the width dimension of the boundary box (corresponding to the width dimension of the white line WL1), $w_5$ is the distance from the right end of the image to the right end of the boundary box (corresponding to the right end of the white line WL1), and $h_3$ is the distance from the lower end of the image to the lower end of the boundary box (corresponding to the front edge of the white line WL1).

When the function to detect the crosswalk CW and the traffic light TL using deep learning is defined as g and the boundary boxes of the crosswalk CW and the traffic light TL that have been predicted using the image $X_t \in R^{w0 \times h0}$ captured by the camera 20 at time t are expressed as $g(X_t)$, a feature amount required to support walking of the visually impaired person can be expressed by the following expressions (1) and (2).

Expression 1

$$j(t)=\{w_3^t, w_4^t, w_5^t, h_t^3, r^t, b^t\}^T = \phi \circ g(X_t) \quad (1)$$

Expression 2

$$\phi: R^{p1 \times 4} \mapsto R^6 \quad (2)$$

Here, expression (2) is an operator for extracting the feature amount j (t) and for performing post-processing on $g(X_t)$, and p1 is the maximum number of boundary boxes per frame.

State Transition Function

Next, the state transition function will be described. As described above, the state transition function is used to determine whether the condition for notifying each of the stop instruction ($y_t=1$), the walking instruction ($y_t=2$), the right deviation warning ($y_t=3$), and the left deviation warning ($y_t=4$) is satisfied.

The state amount (state variable) $s_{t+1}$ at time t+1 can be expressed by the following expression (3) using the time history information J={j(0), j(1), ... j(t)} with respect to the feature amount of the crosswalk CW, the current state amount (state variable) $s_t$, and the image $X_{t+1}$ captured at time t+1.

Expression 3

$$s_{t+1} = f(J, s_t, X_{t+1}) \quad (3)$$

The state transition function f in expression (3) can be defined as the following expression (4) according to the state amount at the current time.

Expression 4

$$f(J, s_t, X_{t+1}) = \begin{cases} f_0(J, X_{t+1}) & \text{if } s_t = 0 \text{ (Walking)} \\ f_1(J, X_{t+1}) & \text{if } s_t = 1 \text{ (Stop)} \\ f_2(J, X_{t+1}) & \text{if } s_t = 2 \text{ (Crossing)} \end{cases} \quad (4)$$

In other words, with the transition of walking for the visually impaired person being repeated as follows: walking (for example, walking toward the crosswalk CW)→stop (for example, stopping before the crosswalk CW)→crossing (for example, crossing the crosswalk CW)→walking (for example, walking after the crossing completion of the crosswalk CW), the state transition function for determining whether the condition for performing the stop instruction ($y_t=1$) to the visually impaired person in the walking state ($s_t=0$) is satisfied is $f_0(J, X_{t+1})$, the state transition function for determining whether the condition for performing the crossing (walking) instruction ($y_t=2$) to the visually impaired person in the stop state ($s_t=1$) is satisfied is $f_1(J, X_{t+1})$, and the state transition function for determining whether the condition for notifying the visually impaired person in the crossing state ($s_t=2$) of walking (completion of crossing) is satisfied is $f_2(J, X_{t+1})$. Further, the state transition function for determining whether the condition for warning the visually impaired person in the crossing state ($s_t=2$) of deviation from the crosswalk CW is satisfied is $f_3(J, X_{t+1})$.

Hereinafter, the state transition function corresponding to each state amount (state variable) will be specifically described.

State Transition Function Applied in Walking State

The state transition function $f_0(j, X_{t+1})$ used when the state amount at the current time is the walking state ($s_t=0$) can be expressed by the following expressions (5) to (7) using the feature amount in expression (1).

Expression 5

$$f_0(J, X_{t+1}) = \\ H(\alpha_1 - h_3^{t+1})H(w_4^{t+1} - \alpha_2) \times \delta\left(\sum_{i=T-t0}^{t} H(\alpha_1 - h_3^{t+1})H(w_4^{t+1} - \alpha_2)\right) \quad (5)$$

Expression 6

$$w_4^{t+1} = I_2^T\{\phi \circ g(X_{t+1})\} \quad (6)$$

Expression 7

$$h_3^{t+1} = I_4^T\{\phi \circ g(X_{t+1})\} \quad (7)$$

Here, H is a Heaviside function and δ is a Delta function. Further, $\alpha_1$ and $\alpha_2$ are parameters used for the determination criteria, and t0 is a parameter for specifying the past state to be used. Further, $I_2=\{0,1,0,0,0,0\}^T$ and $I_4=\{0,0,0,1,0,0\}^T$ hold.

When expression (5) is used, "1" is obtained only when the conditions of $\alpha_1>h_3$ and $w_4>\alpha_2$ are not satisfied in the past time t0 and are satisfied for the first time at time t+1, and otherwise "0" is obtained. That is, when $\alpha_1>h_3$ is satisfied, it is determined that the white line WL1 (the lower end of the boundary box of the white line) positioned in the frontmost position of the crosswalk CW is positioned at the feet of the visually impaired person, and when $w_4>\alpha_2$ is satisfied, it is determined that the white line WL1 extends in a direction orthogonal to the traveling direction of the visually impaired person (the width dimension of the boundary box of the white line exceeds a predetermined dimension). When both $\alpha_1>h_3$ and $w_4>\alpha_2$ are satisfied, "1" is obtained.

When "1" is obtained in expression (5) in this way, it is assumed that the condition for performing the stop instruction ($y_t=1$) is satisfied, and the stop instruction (for example, a stop instruction for walking before the crosswalk CW; the stop notification) is performed to the visually impaired person in the walking state.

Further, in the present embodiment, in addition to the condition that the crosswalk CW is at the feet of the visually impaired person ($\alpha_1>h_3$), a restriction on the width of the detected crosswalk CW ($w_4>\alpha_2$) is added, to prevent a detection error in the case where a crosswalk other than the crosswalk CW located in the traveling direction of the visually impaired person (such as a crosswalk extending in the direction orthogonal to the traveling direction of the visually impaired person at an intersection) is included in the image $X_{t+1}$. That is, even when there is a plurality of crosswalks having different crossing directions at a road intersection or the like, the crosswalk CW that the visually impaired person should cross (the crosswalk CW with the white line WL1 extending in the direction intersecting the direction in which the visually impaired person should cross, so that the width dimension of the white line WL1 is recognized to be relatively wide) and other crosswalks (crosswalks where the width dimension of the white line is recognized to be relatively narrow) can be clearly distinguished from each other, making it possible to accurately perform the crossing start notification to the visually impaired person with high accuracy.

State Transition Function Applied in Stop State

The state transition function $f_1(j, X_{t+1})$ used when the state amount at the previous time is the stop state ($s_t=1$) can be expressed by the following expressions (8) to (10).

Expression 8

$$f_1(J, X_{t+1}) = b^{t+1} \delta\left(\sum_{i=t-t0}^{t} r^i\right) \quad (8)$$

Expression 9

$$b^{t+1} = I_6^T \{\phi \circ g(X'_{t+1})\} \quad (9)$$

Expression 10

$$r^{t+1} = I_5^T \{\phi \circ g(X'_{t+1})\} \quad (10)$$

Here, $X'_{t+1}$ is obtained by trimming and enlarging the image from $X_{t+1}$. That is, the recognition accuracy of the traffic light TL is sufficiently improved in the image $X'_{t+1}$. Further, $I_5=\{0,0,0,0,1,0\}^T$ and $I_6=\{0,0,0,0,0,1\}^T$ hold.

In expression (8), "1" is obtained only when the green light is detected for the first time at time t+1 after the red light is detected in the past time t0, and otherwise "0" is obtained. Details of the recognition operation of the traffic light TL (the recognition operation of the traffic light TL by the traffic light recognition unit 83) will be described later.

When "1" is obtained in expression (8) in this way, it is assumed that the condition for performing the walking (crossing) instruction ($y_t=2$) is satisfied, and the crossing instruction (for example, the crossing instruction of the crosswalk; the crossing notification) is performed to the visually impaired person in the stop state.

The state transition based on the above-mentioned logic may not be possible at a crosswalk at an intersection without a traffic light. In order to solve this issue, a new parameter t1>t0 may be introduced so that when it is determined that there is no state transition from the stop state during time t1, the state transitions to the walking state.

State Transition Function Applied in Crossing State

The state transition function $f_2(j, X_{t+1})$ used when the state amount at the previous time is the crossing state ($s_t=2$) can be expressed by the following expression (11).

Expression 11

$$f_2(J, X_{t+1}) = \delta\left(\sum_{i=t-t0}^{t+1} \left(b^i + r^i + H(\alpha_1 - h_3^i)H(w_4^j - \alpha_2)\right)\right) \quad (11)$$

In expression (11), "1" is obtained only when the traffic light and the crosswalk CW at the feet of the visually impaired person cannot be detected even once from the past t−t0 to the current time t+1, and otherwise "0" is obtained. That is, "1" is obtained only when the traffic light TL and the crosswalk CW at the feet of the visually impaired person cannot be detected because the visually impaired person has completed crossing the crosswalk CW.

When "1" is obtained in expression (11) in this way, it is assumed that the condition for performing the crossing completion is satisfied, and the notification of the crossing completion (completion of crossing the crosswalk) is performed to the visually impaired person in the walking state.

State Transition Function for Determining Deviation from Crosswalk

The state transition function $f_3(j, X_{t+1})$ for determining the deviation from the crosswalk CW while the visually impaired person crosses the crosswalk CW can be expressed by the following expressions (12) to (14).

Expression 12

$$f_3(J, X_{t+1}) = H\left(\frac{\max(w_3^{t+1}, w_5^{t+1})}{w_0} - \alpha_3\right) \quad (12)$$

Expression 13

$$w_3^{t+1} = I_1^T \{\phi \circ g(X_{t+1})\} \quad (13)$$

Expression 14

$$w_5^{t+1} = I_3^T \{\phi \circ g(X_{t+1})\} \quad (14)$$

Here, $\alpha_3$ is a parameter used for a determination criterion. Further, $I_1=\{1,0,0,0,0,0\}^T$ and $I_3=\{0,0,1,0,0,0\}^T$ hold.

In expression (12), "1" is obtained when the amount of deviation from the center of the frame at the position of the detected crosswalk CW is equal to or greater than an allowable amount, and otherwise "0" is obtained. That is, "1" is obtained when the value of $w_3$ becomes larger than the predetermined value (in the case of right deviation) or when the value of $w_5$ becomes larger than the predetermined value (in the case of left deviation).

When "1" is obtained in expression (12) in this way, the right deviation warning ($y_r$=3) or the left deviation warning ($y_r$=4) is performed.

Recognition Operation of Traffic Light

Next, the recognition operation of the traffic light TL, which is a feature operation in the present embodiment, will be described. The recognition operation of the traffic light TL is performed by the traffic light recognition unit 83 as described above.

As shown in FIG. 3, the traffic light recognition unit 83 includes a traffic light first recognition unit 83*a*, a traffic light second recognition unit 83*b*, a determination unit 83*c*, and a re-recognition processing unit 83*d*. The traffic light first recognition unit 83*a*, the traffic light second recognition unit 83*b*, the determination unit 83*c*, and the re-recognition processing unit 83*d* are also functional units realized by the control program. Each of the units will be described below.

The traffic light first recognition unit 83*a* is a functional unit that performs a recognition operation of the traffic light TL for an image acquired (captured) by the camera 20 using a learned model based on pre-annotated data. Specifically, the traffic light first recognition unit 83*a* performs a recognition operation of the traffic light TL using deep learning. That is, using the pre-annotated data of the traffic light TL (labeled data of the traffic light TL, that is, teacher data for recognizing the traffic light TL by deep learning), it is determined whether the traffic light TL exists in the image acquired by the camera 20 (recognition of the existence of the traffic light TL) and recognizes the state of the traffic light TL (whether the traffic light TL is a green light or a red light). Here, as the pre-annotated data, two data, namely, the data in the state where the red lighting portion of the traffic light TL is lit and the data in the state where the green lighting portion of the traffic light TL is lit may be used. Alternatively, only one data may be used as the data of the traffic light TL.

The traffic light second recognition unit 83*b* is a functional unit that performs a recognition operation of the traffic light TL for an image acquired by the camera 20 based on the feature amount of the traffic light TL. The feature amount of the traffic light TL used in the present embodiment is the aspect ratio of the traffic light TL as the shape feature amount, and hue, saturation, and brightness of the lighting color as the color feature amount. Hereinafter, the recognition operation of the traffic light TL using these feature amounts will be described. In the recognition operation of the traffic light TL, a recognition operation using the shape feature amount and a recognition operation using the color feature amount are performed in order.

Figure 12:
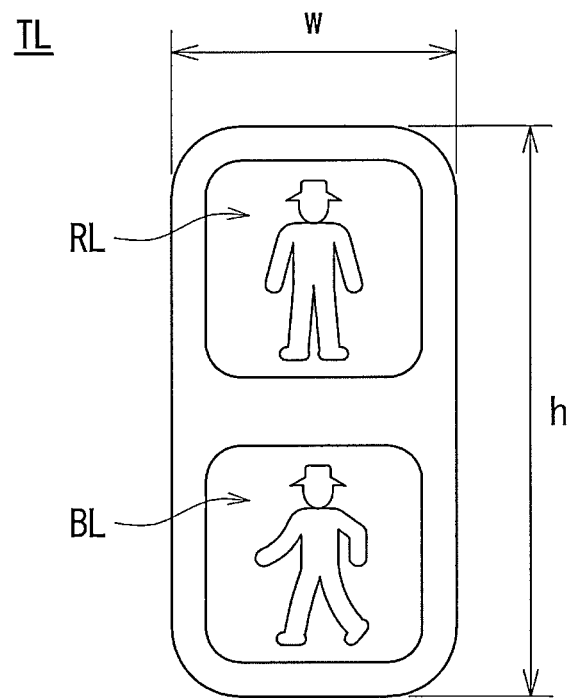
FIG. 12 is a diagram showing the traffic light.

First, the recognition operation using the shape feature amount will be described. The aspect ratio of the traffic light TL is predefined. Therefore, when an object (an image representing the object) having a shape substantially matching this aspect ratio exists in the image acquired by the camera 20, the object having that shape (an image area of the object having that shape) is extracted on assumption that the object is likely to be a traffic light TL. Hereinafter, the image area of the object having that shape will be referred to as a recognition target area. Specifically, as shown in FIG. 12 (a diagram showing the traffic light TL), when the predefined height dimension of the traffic light TL is h and the predefined width dimension is w, an object having an aspect ratio w/h that satisfies the following expression (15) is extracted on assumption that the object is likely to be a traffic light TL (an object existing in the recognition target area).

Expression 15

$$\alpha_{min} < \frac{w}{h} < \alpha_{max} \quad (15)$$

Characters $\alpha_{min}$ and $\alpha_{max}$ in expression (15) are values preset in consideration of a dimensional error or the like in the image when the traffic light TL exists in the image.

By performing the recognition operation using the color feature amount for the recognition target area extracted in this way, a confirmation operation as to whether the traffic light TL exists is performed. Hereinafter, the recognition operation using the color feature amount will be described.

As the recognition operation using the color feature amount, the hue screening operation and the saturation/brightness recognition operation are performed in order.

The hue screening operation is an operation of determining whether the hue of the recognition target area extracted by the recognition operation using the shape feature amount described above matches the lighting color of any of the lighting portions in the traffic light TL. Specifically, an RGB color space is converted into an HSV color space as the color information of the recognition target area in the image acquired by the camera 20. A well-known HSV conversion process is used for this conversion. Here, H represents hue, S represents saturation chroma, and V represents value brightness. In the hue screening operation, it is determined whether the hue H in the recognition target area satisfies the following expression (16).

Expression 16

$$H_{min} < H < H_{max} \quad (16)$$

When the hue H of the recognition target area is red, it is determined whether the color satisfies expression (16) targeting the red lighting color of the traffic light TL, and when the hue H of the recognition target area is green, it is determined whether the color satisfies expression (16) targeting the green lighting color of the traffic light TL. The predetermined range (range of $H_{min}$ to $H_{max}$) in expression (16) is preset as a range in which some disturbance is taken into consideration with respect to the hue when the lighting portion of the traffic light TL is lit. That is, the above values are selected from different values depending on whether the object is a red light or a green light assuming that the object existing in the recognition target area is the traffic light TL, and thus applied to expression (16).

When the hue H of the recognition target area satisfies expression (16), the following saturation/brightness recognition operation is further performed in order to further increase the reliability of the determination of the traffic light TL. As shown in FIG. 12, in the pedestrian traffic light (traffic light) TL, when the red lighting portion RL is lit, the green lighting portion BL adjacent to the lower side thereof is turned off and is black. In contrast, when the green lighting portion BL is lit, the red lighting portion RL adjacent to the upper side thereof is turned off and is black. In the saturation/brightness recognition operation, the above information is used to perform the confirmation operation as to whether the extracted recognition target area is the traffic light TL.

Figure 13:
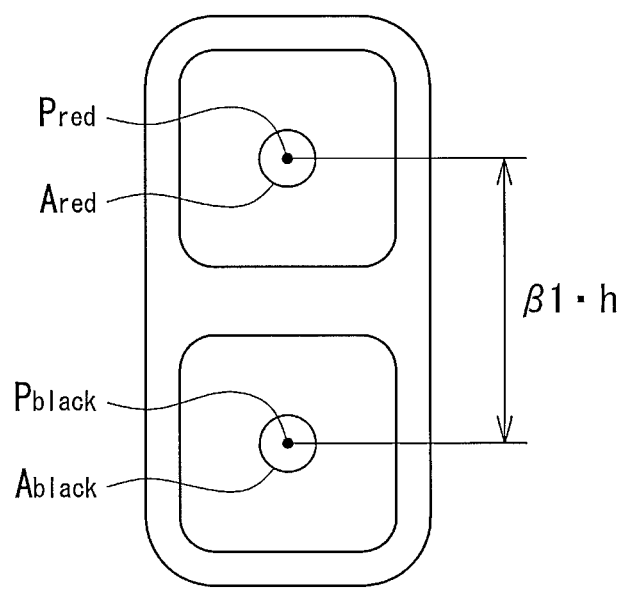
FIG. 13 is a diagram illustrating a second traffic light recognition operation.

In this saturation/brightness recognition operation, the average value of the saturation and the average value of the brightness in the red lighting portion RL of the pedestrian traffic light TL, and the average value of the saturation and the average value of the brightness in the green lighting portion BL are used. Specifically, in the case where the current state of the traffic light TL is a red light, as shown in FIG. 13, a center point $P_{red}$ of the area where the red color is detected in the image is obtained, and a circle $A_{red}$ with a radius of β2·w from the center point $P_{red}$ is set (0<β2<1). Next, a point $P_{black}$ obtained by vertically moving downward by β1·h from the center point $P_{red}$ is set (0<β1<1), and a circle $A_{black}$ with a radius of β2·w centered on the point $P_{black}$ is set. The average value of the saturation of the plurality of pixels existing inside the circle $A_{red}$ is defined as $S_{red}$, and the average value of the brightness thereof is defined as $V_{Red}$. Similarly, the average value of the saturation of the plurality of pixels existing inside the circle $A_{black}$ is defined as $S_{black}$, and the average value of the brightness thereof is defined as $V_{black}$. In this way, each average value is set, and it is determined whether the following expression (17) is satisfied.

Expression 17

$$g_2^{sv}(S_{red}, V_{red}, S_{black}, V_{black}) > L \tag{17}$$

Figures 14, 15:
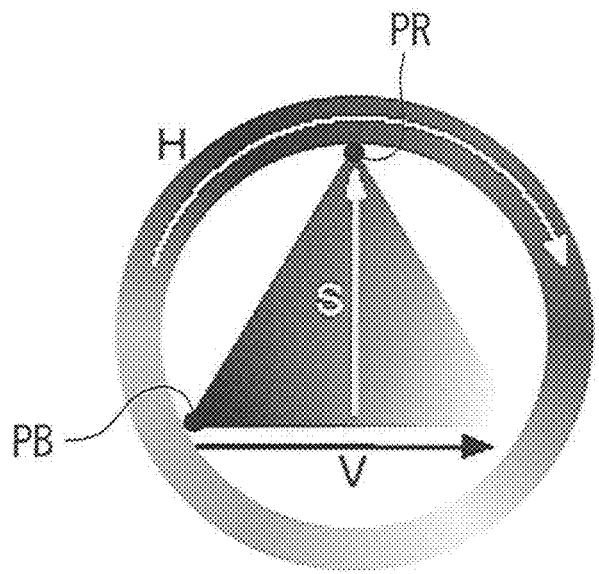
FIG. 14 is a diagram showing an HSV color space.
FIG. 15 is a diagram showing a relationship between results of recognition operations by each recognition unit and determination results.

The calculation $g_2$ in expression (17) is defined as a calculation expression for calculating the deviation amount of each average value in an annular HSV color space. FIG. 14 is a diagram showing the annular HSV color space. In expression (17), the deviation amount of each average value in the HSV color space is calculated. That is, when the object existing in the recognition target area is the traffic light TL, the average value $S_{red}$ of the saturation and the average value $V_{red}$ of the brightness in the area inside the circle $A_{red}$ in the red lighting portion (the portion lit in red) RL correspond to the PR position in the figure, whereas the average value $S_{black}$ of the saturation and the average value $V_{black}$ of the brightness in the area inside the circle $A_{black}$ in the green lighting portion (the unlit black portion) BL correspond to the PB position in the figure. A large distance is obtained between the PR position and the PB position (obtained as a value larger than the distance L in expression (17)), so that expression (17) is satisfied, and it is thus confirmed that the object existing in the recognition target area is a traffic light TL. Also in the case where the green lighting portion BL is lit when the recognition target area is the traffic light TL, it is confirmed whether the object existing in the recognition target area is the traffic light TL according to whether expression (17) is satisfied.

The determination unit 83c is a functional unit that determines whether the traffic light TL can be recognized in the image based on the result of the recognition operation by the traffic light first recognition unit 83a and the result of the recognition operation by the traffic light second recognition unit 83b, which are described above.

The determination operation of the determination unit 83c will be described. The following expression (18) is considered as a function that returns the result $z(t) \in \{0,1\}$ of the recognition operation of the traffic light TL after the image $X_t \in R^{w0 \times h0}$ acquired from the camera 20 at time t is input.

Expression 18

$$k_i : R^{w0 \times h0} \mapsto R \tag{18}$$

Here,

Expression 19

$$i \in \{1, 2\} \tag{19}$$

holds.

The result z(t)=0 of the recognition operation indicates that the traffic light has not been detected, and the result z(t)=1 of the recognition operation indicates that the traffic light has been detected.

In the present embodiment, a model for detecting the crosswalk CW and the traffic light TL using deep learning in the recognition operation by the traffic light first recognition unit 83a is defined as k1. Further, a model for detecting from the geometric feature amount (shape feature amount and color feature amount) of the traffic light TL in the recognition operation by the traffic light second recognition unit 83b is defined as k2. The recognition results of the traffic light TL using these models can be obtained by the following expression (20).

Expression 20

$$z(t) = \prod_{i=1}^{2} k_i(X_t) \tag{20}$$

That is, only when the output of both models is 1 (when the traffic light TL is recognized in both the recognition operation by the traffic light first recognition unit 83a and the recognition operation by the traffic light second recognition unit 83b), z(t)=1 holds in expression (20), and when the output of at least one model is 0 (when the traffic light TL is not recognized in at least one of the recognition operation by the traffic light first recognition unit 83a and the recognition operation by the traffic light second recognition unit 83b), z(t)=0 holds in expression (20).

FIG. 15 is a diagram showing a relationship between the results of the recognition operation by each recognition unit 83a, 83b and the determination result by the determination unit 83c. As shown in FIG. 15, when the result that the traffic light TL is recognized is obtained in both the recognition operation by the traffic light first recognition unit 83a (method 1) and the recognition operation by the traffic light second recognition unit 83b (method 2) (in the case of Case 1), the determination unit 83c determines that the traffic light TL is recognized in front in the walking direction. When the result that the traffic light TL is recognized is obtained in neither the recognition operation by the traffic light first recognition unit 83a nor the recognition operation by the traffic light second recognition unit 83b (in the case of Case 4), the determination unit 83c determines that the traffic light TL does not exist in front in the walking direction.

When the result that the traffic light TL is recognized is obtained only in the recognition operation by one recognition unit of the recognition operation by the traffic light first recognition unit 83a and the recognition operation by the traffic light second recognition unit 83b (in the case of Case 2 or Case 3), the information is transmitted to the re-recognition processing unit 83d without determining whether the traffic light is recognized, thereby causing the re-recognition processing unit 83d to perform the recognition operation again (re-inference) on the data after correction as described later.

The re-recognition processing unit 83d is a functional unit that, when the result that the traffic light TL is recognized is obtained only in the recognition operation by one recognition unit of the recognition operation by the traffic light first recognition unit 83a and the recognition operation by the traffic light second recognition unit 83b, performs an auxiliary process using the result of the recognition operation by the one recognition unit and causes the other recognition unit to perform the recognition operation again.

Specifically, when the result that the traffic light TL is recognized is obtained only in the recognition operation by the traffic light first recognition unit 83a (in the case of Case 3), the area where the traffic light TL exists (the position in the image) is known by deep learning, so that a cut-out process and an enlarging process are performed on the area where the traffic light TL exists obtained by deep learning, thereby causing the traffic light second recognition unit 83b to perform the recognition operation again. That is, after limiting the area where the traffic light TL is likely to exist, the recognition operation based on the geometric feature amount of the traffic light TL in this area is caused to be performed again. On the other hand, when the result that the traffic light TL is recognized is obtained only in the recognition operation by the traffic light second recognition unit 83b (in the case of Case 2), in consideration of whether the shape and the lighting color of the traffic light TL that are the feature amounts of the traffic light TL satisfy the predetermined requirements, the image is preprocessed for the requirements to perform a filtering process of unnecessary information (a process of deleting information of an area that does not match the shape or the color), thereby causing the traffic light first recognition unit 83a to perform the recognition operation again.

Walking Support Operation

Next, the flow of the walking support operation performed by the walking support system 10 will be described.

Figure 16:
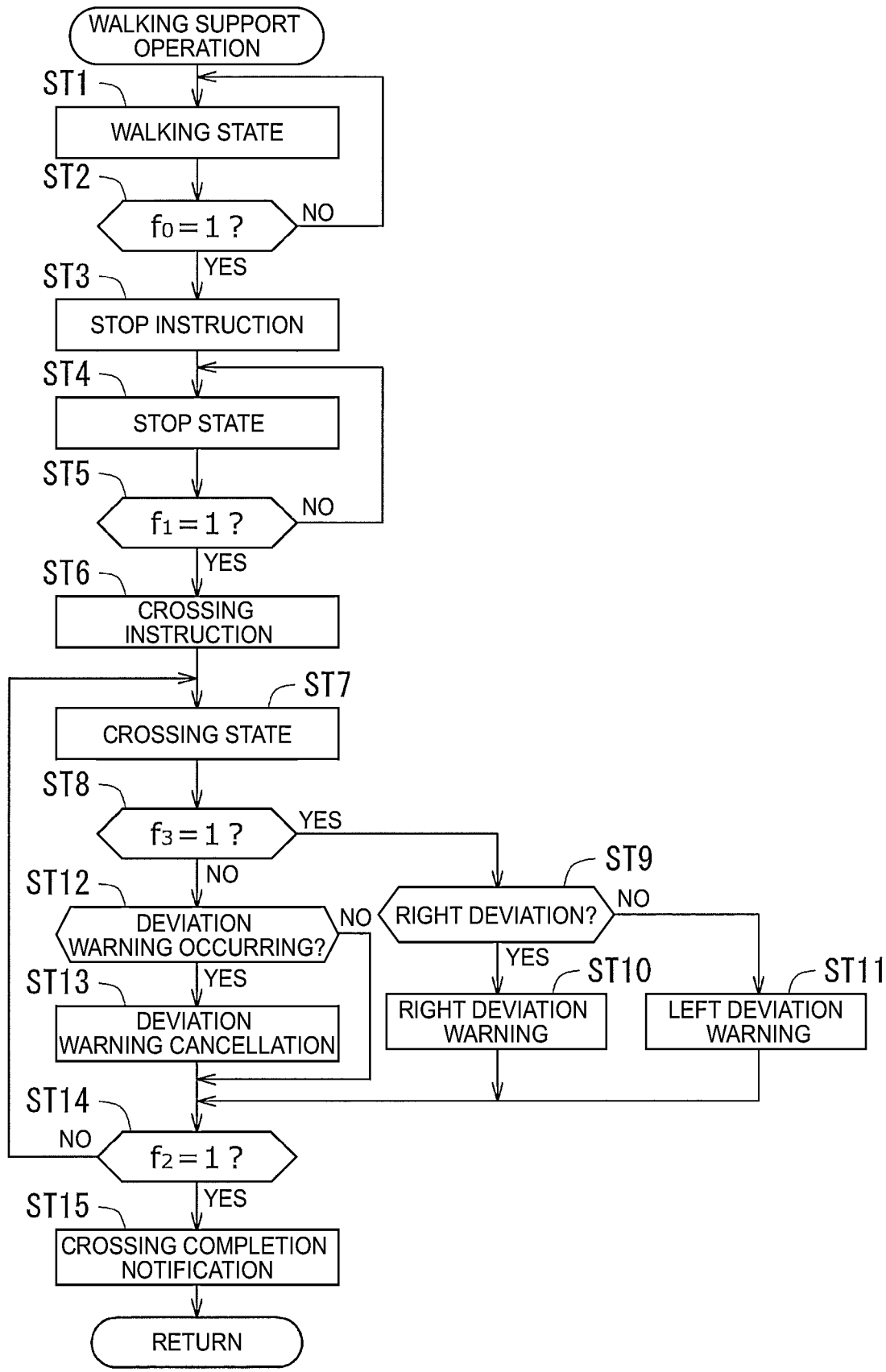
FIG. 16 is a flowchart showing a procedure for a walking support operation by the walking support system.

FIG. 16 is a flowchart showing a flow of a series of the walking support operation described above. This flowchart is repeatedly executed at a predetermined time interval so that one routine is executed from a predetermined time t to a predetermined time t+1 in a situation where a visually impaired person is walking on the street (on the sidewalk). In the following description, the description of the variable $(J, X_{t+1})$ in each state transition function will be omitted.

First, in a situation where a visually impaired person is in a walking state in step ST1, it is determined in step ST2 whether "1" is obtained in the state transition function $f_0$ (the above expression (5)) for determining whether the condition for performing the above-mentioned stop instruction ($y_t$=1) is satisfied based on the position of the white line WL1 of the crosswalk CW in the image area including the crosswalk CW recognized by the crosswalk detection unit 82 (more specifically, the position of the boundary box of the white line WL1 located in the frontmost position).

When "0" is obtained in this state transition function $f_0$, NO is determined assuming that the condition for performing the stop instruction ($y_t$=1) is not satisfied, that is, the visually impaired person has not yet reached a position before the crosswalk CW, and the process returns to step ST1. Since NO is determined in step ST2 until the visually impaired person reaches the position before the crosswalk CW, the operations of steps ST1 and ST2 are repeated.

When the visually impaired person reaches the position before the crosswalk CW and "1" is obtained in the state transition function $f_0$, YES is determined in step ST2, and the process proceeds to step ST3. In step ST3, the stop instruction ($y_t$=1) is performed to the visually impaired person. Specifically, the vibration generation device 50 in the white cane 1 held by the visually impaired person vibrates in a pattern indicating the stop instruction (stop notification). As a result, the visually impaired person gripping the grip portion 3 of the white cane 1 recognizes that the stop instruction has been performed by sensing the vibration pattern of the vibration generation device 50, and stops walking.

In a situation where the visually impaired person is in the stop state in step ST4, it is determined in step ST5 whether "1" is obtained in the state transition function $f_1$ (the above expression (8)) for determining whether the condition for performing the above-mentioned walking instruction ($y_t$=2) is satisfied. In the determination operation in this state transition function $f_1$, as shown in FIG. 4 described above, the area A surrounded by the dashed line is extracted, and the above-mentioned recognition operation of the traffic light TL by the traffic light first recognition unit 83a and the recognition operation of the traffic light TL by the traffic light second recognition unit 83b are performed. Further, the re-recognition processing unit 83d performs the recognition operation again (re-inference) as necessary. Hereinafter, these recognition operations will be described with reference to the flowchart of FIG. 17 (a subroutine showing a traffic light recognition operation in the flowchart of FIG. 16).

In step ST21 in the subroutine of FIG. 17, it is determined whether a variable M that defines the number of retries of the traffic light recognition operation has not reached a predetermined value Mmax. Since the variable M is zero at the start of the traffic light recognition operation, YES is determined in step ST21, and the process proceeds to step ST22.

In step ST22, the recognition operation of the traffic light TL by the traffic light first recognition unit 83a and the recognition operation of the traffic light TL by the traffic light second recognition unit 83b are executed. That is, the recognition operation of the traffic light TL for the acquired image using the learned model based on the pre-annotated data, and the recognition operation of the traffic light TL for the acquired image based on the feature amount of the traffic light TL are performed.

In step ST23, it is determined whether the result of the recognition operation by the traffic light first recognition unit 83a (z1) indicates the result that the traffic light TL is recognized (z1=1), and the result of the recognition operation by the traffic light second recognition unit 83b (z2) also indicates the result that the traffic light TL is recognized (z2=1). When the results of both recognition operations indicate the result that the traffic light TL is recognized and YES is determined in step ST23, the process proceeds to step ST24 to confirm that the traffic light TL is recognized (recognition confirmation by the determination unit 83c).

When NO is determined in step ST23, the process proceeds to step ST25, and it is determined whether the result of the recognition operation by the traffic light first recognition unit 83a (z1) indicates the result that the traffic light TL is not recognized (z1=0), and the result of the recognition operation by the traffic light second recognition unit 83b (z2) also indicates the result that the traffic light TL is not recognized (z2=0). When the results of both recognition operations indicate the result that the traffic light TL is not recognized and YES is determined in step ST25, the process proceeds to step ST26 to confirm that the traffic light TL is not recognized, that is, that the traffic light TL does not exist in front of the visually impaired person (confirmation by the determination unit 83c that the traffic light does not exist).

When NO is determined in step ST25, the process proceeds to step ST27, and it is determined whether the result of the recognition operation by the traffic light first recognition unit 83a (z1) indicates the result that the traffic light TL is recognized (z1=1), and the result of the recognition operation by the traffic light second recognition unit 83b (z2)

indicates the result that the traffic light TL is not recognized (z2=0). That is, it is determined whether the traffic light TL is recognized only in the recognition operation by the traffic light first recognition unit 83*a*. When this determination is YES, the process proceeds to step ST28 to perform image correction (the cut-out process and the enlarging process on the area where the traffic light TL exists obtained by deep learning), and in step ST31, 1 is added to the variable M (M+1), thereby the process is returned. That is, after performing the cut-out process and the enlarging process on this area, the traffic light second recognition unit 83*b* is caused to perform the recognition operation again.

When NO is determined in step ST27, the process proceeds to step ST29, and it is determined whether the result of the recognition operation by the traffic light first recognition unit 83*a* (z1) indicates the result that the traffic light TL is not recognized (z1=0), and the result of the recognition operation by the traffic light second recognition unit 83*b* (z2) indicates the result that the traffic light TL is recognized (z2=1). That is, it is determined whether the traffic light TL is recognized only in the recognition operation by the traffic light second recognition unit 83*b*. When this determination is YES, the process proceeds to step ST30 to perform image correction (a process in which, in consideration of whether the shape and the lighting color of the traffic light TL that are the feature amounts of the traffic light TL satisfy the predetermined requirements, the image is preprocessed for the requirements to perform a filtering process of unnecessary information), and in step ST31, 1 is added to the variable M (M+1), thereby the process is returned. That is, after performing the filtering process of the unnecessary information, the traffic light first recognition unit 83*a* is caused to perform the recognition operation again.

When the variable M reaches the predetermined value Mmax by performing the recognition operation a plurality of times in this way and NO is determined in step ST21, the process proceeds to step ST32 to confirm that the traffic light TL does not exist in front of the visually impaired person (confirmation by the determination unit 83*c* that the traffic light does not exist). When NO is determined in step ST29, assuming that the transmission/reception of the result of the recognition operation may not be successfully performed, the process proceeds to step ST31 without performing the image correction, thereby causing the traffic light first recognition unit 83*a* to perform the recognition operation again and the traffic light second recognition unit 83*b* to perform the recognition operation again.

After the existence of the traffic light TL is confirmed in the above subroutine (FIG. 17), it is determined in step ST5 of the flowchart in FIG. 16 whether "1" is obtained in the state transition function $f_1$ (the above expression (8)) for determining whether the condition for performing the walking instruction ($y_t$=2) is satisfied.

When "0" is obtained in this state transition function $f_1$, NO is determined assuming that the condition for performing the walking instruction ($y_t$=2) is not satisfied, that is, the traffic light TL has not yet switched to the green light, and the process returns to step ST4. Since NO is determined in step ST5 until the traffic light TL switches to the green light, the operations of steps ST4 and ST5 are repeated.

When the traffic light TL switches to the green light and "1" is obtained in the state transition function $f_1$, YES is determined in step ST5, and the process proceeds to step ST6. This operation corresponds to the operation of the switching recognition unit (switching recognition unit that recognizes that the state of the traffic light has switched from the stop instruction state to the crossing permission state) 84.

In step ST6, the walking (crossing) instruction ($y_t$=2) is performed to the visually impaired person. Specifically, the vibration generation device 50 in the white cane 1 held by the visually impaired person vibrates in a pattern indicating the walking instruction (crossing start notification). As a result, the visually impaired person gripping the grip portion 3 of the white cane 1 recognizes that the walking instruction has been performed and starts crossing the crosswalk CW.

In a situation where the visually impaired person is crossing the crosswalk CW in the crossing state in step ST7, it is determined in step ST8 whether "1" is obtained in the state transition function $f_3$ (the above expression (12)) for determining whether the condition for warning the deviation from the crosswalk CW is satisfied.

When "1" is obtained in the state transition function $f_3$ and YES is determined in step ST8, it is determined in step ST9 whether the direction of the deviation from the crosswalk CW is the right direction (right deviation). When the direction of the deviation from the crosswalk CW is the right direction and YES is determined in step ST9, the process proceeds to step ST10, and the right deviation warning ($y_t$=3) is performed to the visually impaired person. Specifically, the vibration generation device 50 in the white cane 1 held by the visually impaired person vibrates in a pattern indicating the right deviation warning. As a result, the visually impaired person gripping the grip portion 3 of the white cane 1 recognizes that the right deviation warning has been performed, and changes the walking direction toward the left direction.

On the other hand, when the direction of the deviation from the crosswalk CW is the left direction and NO is determined in step ST9, the process proceeds to step ST11, and the left deviation warning ($y_t$=4) is performed to the visually impaired person. Specifically, the vibration generation device 50 in the white cane 1 held by the visually impaired person vibrates in a pattern indicating the left deviation warning. As a result, the visually impaired person gripping the grip portion 3 of the white cane 1 recognizes that the left deviation warning has been performed, and changes the walking direction toward the right direction. After performing the deviation warning in this way, the process proceeds to step ST14.

When there is no deviation from the crosswalk CW and "0" is obtained in the state transition function $f_3$, NO is determined in step ST8 and the process proceeds to step ST12. In step ST12, it is determined whether the deviation warning in step ST10 or step ST11 is currently occurring. When the deviation warning is not occurring and NO is determined in step ST12, the process proceeds to step ST14. On the other hand, when the deviation warning is occurring and YES is determined in step ST12, the process proceeds to step ST13 to cancel the deviation warning, and the process proceeds to step ST14.

In step ST14, it is determined whether "1" is obtained in the state transition function $f_2$ (the above expression (11)) for determining whether the condition for notifying the crossing completion is satisfied.

When "0" is obtained in this state transition function $f_2$, NO is determined assuming that the condition for notifying the crossing completion is not satisfied, that is, the visually impaired person is crossing the crosswalk CW, and the process returns to step ST7. Since NO is determined in step ST14 until the crossing of the crosswalk CW is completed, the operations of steps ST7 to ST14 are repeated.

That is, the following operation is performed until the crossing of the crosswalk CW is completed: when a deviation from the crosswalk CW occurs while the visually impaired person is crossing, the above-mentioned deviation warning is performed, and when this deviation is resolved, the deviation warning is canceled.

When the visually impaired person completes the crossing of the crosswalk CW and "1" is obtained in the state transition function $f_2$, YES is determined in step ST14, and the process proceeds to step ST15 to perform the notification of the crossing completion to the visually impaired person. Specifically, the vibration generation device 50 in the white cane 1 held by the visually impaired person vibrates in a pattern indicating the crossing completion. As a result, the visually impaired person gripping the grip portion 3 of the white cane 1 recognizes that the notification of the crossing completion has been performed, and returns to the normal walking state.

In this way, the above-described operation is repeated every time the visually impaired person crosses the crosswalk CW.

Effect of Embodiment

As described above, in the present embodiment, it is determined whether the traffic light TL is recognized in the image captured by the camera 20 based on each of the result of the recognition operation by the traffic light first recognition unit 83a (the recognition operation of the traffic light TL for an image captured by the camera 20 using a learned model based on pre-annotated data) and the result of the recognition operation by the traffic light second recognition unit 83b (the recognition operation of the traffic light TL for the image captured by the camera 20 based on the feature amount of the traffic light TL). This makes it possible to sufficiently obtain the recognition accuracy of the traffic light TL, and to appropriately perform an instruction to a pedestrian (visually impaired person) according to the state of the traffic light TL.

Further, in the present embodiment, when the result is obtained that the traffic light TL is recognized only in the recognition operation by one recognition unit of the recognition operation by the traffic light first recognition unit 83a and the recognition operation by the traffic light second recognition unit 83b, an auxiliary process using the result of the recognition operation by the one recognition unit is performed to cause the other recognition unit to perform the recognition operation again. Therefore, when the traffic light TL is not recognized in the recognition operation by one of the recognition units (when the traffic light TL is not recognized even though the traffic light TL exists), the possibility that the traffic light TL is recognized in the re-recognition operation can be increased, and high reliability can be obtained in the recognition operation of the traffic light TL.

Further, in the present embodiment, the crossing start notification is performed to the visually impaired person on condition that the state of the traffic light TL has switched from the red light to the green light. Therefore, when the visually impaired person crosses the crosswalk CW, it is possible to secure sufficient time during which the state of the traffic light TL is the green light.

Further, in the present embodiment, since the walking support system 10 is realized only with the white cane 1 by incorporating the components of the walking support system 10 into the white cane 1, a highly practical walking support system 10 is provided.

Other Embodiments

It should be noted that the present disclosure is not limited to the above-described embodiment, and all modifications and applications included in the claims and the range equivalent to the claims can be applied.

For example, in the above-described embodiment, a case where the walking support system 10 is built in the white cane 1 used by a visually impaired person has been described. The present disclosure is not limited to this, and the walking support system 10 may be built in a cane, a wheel walker, or the like when the pedestrian is an elderly person.

Further, in the above embodiment, the stop instruction ($y_f=1$) is performed when the visually impaired person reaches the crosswalk CW (the stop instruction is performed even when the traffic light TL is the green light), and the walking instruction ($y_f=2$) is performed at the timing when the traffic light TL switches from the red light to the green light. That is, the recognition operation of the traffic light TL according to the present disclosure is mainly used for performing the walking instruction ($y_f=2$). The present disclosure is not limited to this, and the recognition operation of the traffic light TL may be performed when the visually impaired person reaches the crosswalk CW to be used for performing the stop instruction ($y_f=1$).

Further, in the above embodiment, the white cane 1 is provided with the charging socket 70 and the battery (secondary battery) 60 is charged from a household power source. The present disclosure is not limited to this, and a photovoltaic power generation sheet may be attached to the surface of the white cane 1 to charge the battery 60 with the electric power generated by the photovoltaic power generation sheet. Further, a primary battery may be used instead of the secondary battery. Furthermore, the white cane 1 may have a built-in pendulum generator, and the pendulum generator may be used to charge the battery 60.

In the above-described embodiment, the types of notifications are classified according to the vibration pattern of the vibration generation device 50. The present disclosure is not limited to this, and the notifications may be performed by voice.

The present disclosure is applicable to a walking support system that performs a crossing start notification of a crosswalk to a walking visually impaired person.

What is claimed is:

1. A walking support system that recognizes a traffic light located in front of a pedestrian in a walking direction and that performs at least one of a stop instruction to the pedestrian before a crosswalk and a crossing start instruction of the crosswalk to the pedestrian according to a state of the traffic light, the walking support system comprising:
   an image acquisition unit that is able to acquire an image in front of the pedestrian in the walking direction;
   a traffic light first recognition unit that performs a recognition operation of the traffic light for the image acquired by the image acquisition unit using a learned model based on pre-annotated data;
   a traffic light second recognition unit that performs a recognition operation of the traffic light for the image acquired by the image acquisition unit based on a feature amount of the traffic light; and
   a determination unit that determines whether the traffic light is recognized in the image based on each of a result of the recognition operation by the traffic light first recognition unit and a result of the recognition operation by the traffic light second recognition unit,
   wherein when the determination unit obtains a result that the traffic light is recognized in both the recognition operation by the traffic light first recognition unit and the recognition operation by the traffic light second recognition unit, the determination unit determines that the traffic light is recognized in front in the walking direction, and when the determination unit obtains a result that the traffic light is not recognized in both the recognition operation by the traffic light first recognition unit and the recognition operation by the traffic light second recognition unit, the determination unit determines that the traffic light does not exist in front in the walking direction.

2. The walking support system according to claim 1, further comprising a re-recognition processing unit that, when a result that the traffic light is recognized is obtained only in a recognition operation by one recognition unit of the recognition operation by the traffic light first recognition unit and the recognition operation by the traffic light second recognition unit, performs an auxiliary process using the result of the recognition operation by the one recognition unit and causes the other recognition unit to perform the recognition operation again.

3. The walking support system according to claim 2, wherein when a result that the traffic light is recognized is obtained only in the recognition operation by the traffic light first recognition unit, the re-recognition processing unit performs a cut-out process and an enlarging process on an area where the traffic light exists obtained by deep learning, and causes the traffic light second recognition unit to perform the recognition operation again.

4. The walking support system according to claim 2, wherein when a result that the traffic light is recognized is obtained only in the recognition operation by the traffic light second recognition unit, the re-recognition processing unit performs, in consideration of whether a shape and a lighting color of the traffic light that are feature amounts of the traffic light satisfy predetermined requirements, a preprocess for the requirements on the image to perform a filtering process of unnecessary information, and causes the traffic light first recognition unit to perform the recognition operation again.

5. The walking support system according to claim 1, wherein the feature amounts of the traffic light are an aspect ratio predefined for the traffic light and a hue, a saturation, and a brightness of a lighting color.

6. The walking support system according to claim 5, wherein the traffic light second recognition unit performs the recognition operation using an average value of the saturation and an average value of the brightness of a plurality of pixel areas in an area corresponding to the hue of the lighting color in the image acquired by the image acquisition unit.

7. The walking support system according to claim 6, wherein the traffic light second recognition unit recognizes that the traffic light exists when both a deviation amount of the average value of the saturation and a deviation amount of the average value of the brightness exceed a predetermined amount, the saturation and the brightness being a saturation and a brightness in each of the area corresponding to the hue of the lighting color in the image acquired by the image acquisition unit and a predetermined area adjacent to the area.

8. The walking support system according to claim 1, wherein the image acquisition unit, the traffic light first recognition unit, the traffic light second recognition unit, and the determination unit are built in a white cane used by a visually impaired person.

9. The walking support system according to claim 8, further comprising a notification unit for performing a notification to the pedestrian to stop before the crosswalk or to start crossing the crosswalk according to the state of the traffic light located in front of the pedestrian in the walking direction, wherein the notification unit is configured to perform the notification to the visually impaired person by vibration or voice.

* * * * *